2,865,801
PROPARGYL PHOSPHOROTHIOATES

Joseph W. Baker and George A. Saul, Nitro, W. Va., assignors to Monsanto Chemical Company, St. Louis, Mo., a corporation of Delaware No Drawing. Application April 6, 1956
Serial No. 576,546

11 Claims. (Cl. 167—22)

This invention relates to new organic phosphorus compounds and to methods for their preparation.

The new compounds may be represented by the structure

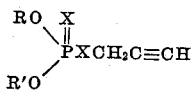

where R and R' represent lower alkyl or alkoxy substituted lower alkyl radicals and X represents a chalkogen of atomic weight less than 40. The new compounds combine high pesticidal activity with low mammalian toxicity. They are for the most part liquids insoluble in water and soluble in common organic solvents. Typical members of the class may be conveniently prepared by reacting a propargyl halide with a salt of a phosphorothioic acid. Other methods of synthesis are also suitable, as hereinafter pointed out in the detailed examples.

Example 1

Into a suitable glass or glass-lined reactor fitted with stirrer and thermometer was charged 67.7 parts by weight (0.33 molecular proportion) of $(C_2H_5O)_2PSSNH_4$, 39.6 parts by weight (0.33 molecular proportion) of propargyl bromide and 175 parts by weight of benzene. The reaction mixture was slowly heated to 80° C. over a period of an hour and then heated at refluxing temperature for about 3 hours after which it was cooled, filtered, washed with aqueous sodium bicarbonate solution and finally with water. The solvent was removed by distillation under reduced pressure, leaving the desired O,O-diethyl S-(2-propynyl) phosphorodithioate as an amber liquid residue. The yield was 70.0 parts by weight or 93.5% theory. Analysis gave 13.8% phosphorus and 27.9% sulfur compared to 13.8% phosphorus and 28.6% sulfur calculated for $C_7H_{13}O_2PS_2$.

Example 2

The charge consisted of 58.4 parts by weight (0.33 molecular proportion) of $(CH_3O)_2PSSNH_4$, 39.6 parts by weight (0.33 molecular proportion) of propargyl bromide and 220 parts by weight of benzene. These materials were heated at refluxing temperature for about 8 hours, the solids then separated by filtration, the filtrate washed with sodium bicarbonate solution and then water and the solvent removed by distillation under reduced pressure to yield 58.3 parts by weight (89.2%) of O,O-dimethyl S-(2-propynyl) phosphorodithioate as a red-amber liquid residue. Analysis gave 16.1% phosphorus and 32.8% sulfur as compared to 15.8% phosphorus and 32.6% sulfur calculated for $C_5H_9O_2PS_2$.

Example 3

The charge consisted of 50.5 parts by weight (0.2 molecular proportion) of $(i\text{-}C_3H_7O)_2PSSK$, 23.8 parts by weight (0.2 molecular proportion) of propargyl bromide and 265 parts by weight of benzene. The reaction mixture was heated at refluxing temperature for about 8 hours and the product isolated as described in Example 2. O,O-diisopropyl S-(2-propynyl) phosphorodithioate was obtained as a yellow-amber liquid. Analysis gave 12.7% phosphorus and 25.4% sulfur as compared to 12.3% phosphorus and 25.4% sulfur calculated for $C_9H_{17}O_2PS_2$.

Example 4

The charge consisted of 56.2 parts by weight (0.3 molecular proportion) of $(C_2H_5O)_2POSNH_4$, 35.7 parts by weight (0.3 molecular proportion) of propargyl bromide and 156 parts by weight of anhydrous ethyl alcohol. These materials were heated at refluxing temperature for about 8 hours. The solids were then removed by filtration and the filtrate, after being freed of alcohol by distillation, was redissolved in benzene and washed with water. The solvent was again removed under reduced pressure, heating to 100° C./4 mm. to yield O,O-diethyl S-(2-propynyl) phosphorothioate. Analysis of the liquid product gave 14.9% phosphorus and 15.2% sulfur compared to 14.7% phosphorus and 15.4% sulfur calculated for $C_7H_{13}O_3PS$.

Example 5

Into a glass or glass-lined reactor was charged 74.5 parts by weight (0.3 molecular proportion) of $(CH_3OC_2H_4O)_2PSSH$. The dithioacid was stirred while to it was added over a period of about 20 minutes at 10–15° C. 104 parts by weight (0.3 molecular proportion) of 19.4% sodium ethylate. There was then added 35.7 parts by weight (0.3 molecular proportion) of propargyl bromide and the mixture heated at refluxing temperature for about 6 hours. The solvent was then stripped by heating to 90° C. under 25 mm. pressure, the residue quenched with water and dissolved in chloroform. The chloroform solution was washed first with sodium bicarbonate solution and then with water. The solvent was removed by heating to 110° C. under 6 mm. pressure to yield O,O-bis-(2-methoxyethyl) S-(2-propynyl) phosphorodithioate as an amber liquid in 97% yield.

Example 6

Into a glass reactor was charged 62.9 parts by weight (0.33 molecular proportion) of $(C_2H_5O)_2PSCl$, 18.7 parts by weight (0.33 molecular proportion) of propargyl alcohol, 35.3 parts by weight (0.33 molecular proportion) of anhydrous sodium carbonate, 1 part by weight of copper powder and 200 parts by weight of methyl ethyl ketone. The mixture was heated at refluxing temperature for about 5 hours, the solids filtered off and the solvent removed from the filtrate by distillation under reduced pressure. The residual liquid was dissolved in chloroform, washed with sodium bicarbonate solution, then water, and the solvent removed under reduced pressure to yield as a liquid residue O,O-diethyl O-(2-propynyl) phosphorothioate.

Example 7

The charge consisted of 69.3 parts by weight (0.3 molecular proportion) of $(n\text{-}C_3H_7O)_2PSSNH_4$, 35.7 parts by weight (0.3 molecular proportion) of propargyl bromide and 265 parts by weight of benzene. These materials were heated at refluxing temperature for about 7 hours and the by-product salt filtered off and the filtrate extracted first with sodium bicarbonate solution and then with water. The solvent was removed under reduced pressure to yield as a residue O,O-dipropyl S-(2-propynyl) phosphorodithioate as an amber liquid in 98% yield. Analysis gave 12.5% phosphorus and 24.8% sulfur as compared to 12.3% phosphorus and 25.4% sulfur calculated for $C_9H_{17}O_2PS_2$.

*Example 8*

The charge consisted of 77.8 parts by weight (0.3 molecular proportion) of $(C_4H_9O)_2PSSNH_4$, 35.7 parts by weight (0.3 molecular proportion) of propargyl bromide and 265 parts by weight of benzene. The reaction mixture was heated at refluxing temperature for about 12 hours and after cooling to room temperature the by-product ammonium bromide removed by filtration. The filtrate was washed first with sodium bicarbonate solution and with water and the solvent removed by heating to 100° C. under 7 mm. pressure to yield O,O-dibutyl S-(2-propynyl) phosphorodithioate as a light yellow liquid product in 91% yield. Analysis gave 11.1% phosphorus and 22.5% sulfur compared to 11.1% phosphorus and 22.8% sulfur calculated for $C_{11}H_{21}O_2PS_2$.

As illustrative of the insecticidal activity aqueous emulsions containing the new compounds in concentrations hereinafter indicated were employed for dipping thereinto infested leaves of plants. Contact effects were observed on the infested leaves. On the dipped infested plants 100% kill of mobile stages of the two-spotted mite was obtained by dipping the infested plant in an emulsion of 0.1% concentration of either O,O-dimethyl S-(2-propynyl) phosphorodithioate, O,O-diethyl S-(2-propynyl) phosphorodithioate or O,O-diethyl S-(2-propynyl) phosphorothioate.

The new compounds were tested as systemic insecticides by immersing excised stems of bean plants in emulsions of the chemicals for three days. The leaves were then cut off, infested with the chosen insects and the percent kill noted after 48 hours. Tested against Mexican bean beetle larvae and mobile stages of the two-spotted spider mite, emulsions containing 0.001% of O,O-dimethyl S-(2-propynyl) phosphorodithioate killed 100% of the insects. A kill of 100% was also obtained with emulsions containing 0.004% of O,O-diethyl S-(2-propynyl) phosphorodithioate. Definite systemic activity was also observed with O,O-bis(2-methoxyethyl) S-(2-propynyl) phosphorodithioate and O,O-diethyl S-(2-propynyl) phosphorothioate. Significantly, the toxicity of the new compounds to warm blooded animals is much less than the toxicity of some important commercial phosphorus insecticides. For example, the acute oral $LD_{50}$ to rats is 590 mg./kg. for O,O-dimethyl S-(2-propynyl) phosphorodithioate.

The new compounds are useful for destroying a variety of insect pests by contacting the insect in its environment either directly or indirectly through translocation within the plant. The compounds may be applied in solution, emulsion, water dispersion or as a dust formulation wherein the active ingredient is distributed over a dry free flowing powder, as for example clays, including bentonite and attapulgite or such materials as talc, diatomaceous earth, fuller's earth, chalk or calcium carbonate. The required concentrations of active ingredient are small because of the high effectiveness of the new compounds. Sprays for application to agricultural crops may suitably be applied at concentrations of 0.001–1%.

It is intended to cover all changes and modifications of the examples of the invention herein chosen for purposes of disclosure which do not constitute departures from the spirit and scope of the invention.

What is claimed is:

1. A compound of the structure

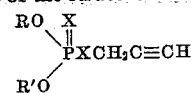

where R and R' are selected from the group consisting of lower alkyl and lower alkoxy substituted lower alkyl groups and X represents a chalkogen of atomic weight less than 40, at least one of which is sulfur.

2. A compound of the structure

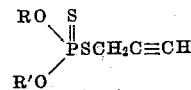

where R and R' represent lower alkyl groups.

3. A compound of the structure

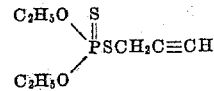

4. A compound of the structure

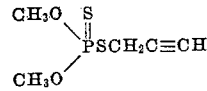

5. A compound of the structure

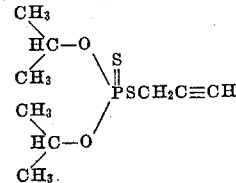

6. A compound of the structure

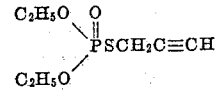

7. A compound of the structure

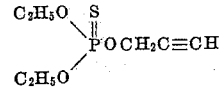

8. A process for the manufacture of propargyl phosphorothioates which comprises condensing a propargyl halide with a salt selected from the group consisting of alkali metal and ammonium salts of an acid having the structure

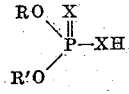

where R and R' are selected from the group consisting of lower alkyl and lower alkoxy substituted lower alkyl groups and X represents a chalkogen of atomic weight less than 40, at least one of which is sulfur.

9. A process for the manufacture of propargyl phosphorothioates which comprises condensing propargyl alcohol in the presence of an HCl acceptor with a compound of the structure

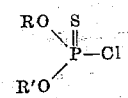

where R and R' are selected from the group consisting of lower alkyl and lower alkoxy substituted lower alkyl groups.

10. A pesticidal composition suitable for application to living plants consisting essentially of a major proportion of an inert carrier non-toxic to plants and a minor but effective proportion as an essential active component thereof a compound of the structure

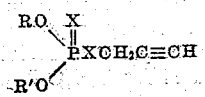

where R and R' are alkyl groups containing less than four carbon atoms and X is a chalkogen of atomic weight less than 40, at least one of which is sulfur.

11. A method of protecting plants from insect pests which comprises treating the plant with a composition containing as an essential active ingredient a compound of the structure.

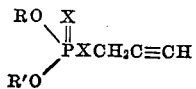

where R and R' are alkyl groups containing less than four carbon atoms and X is a chalkogen of atomic weight less than 40, at least one of which is sulfur.

References Cited in the file of this patent

UNITED STATES PATENTS

| | | |
|---|---|---|
| 2,596,076 | Hook et al. | May 6, 1952 |
| 2,693,483 | Tolkmith | Nov. 2, 1954 |